United States Patent [19]

Mitsui et al.

[11] 3,767,987

[45] Oct. 23, 1973

[54] CONTROL APPARATUS FOR AN INDUCTION MOTOR

[75] Inventors: Nobuo Mitsui, Katsuta-shi; Akinori Watanabe, Katsuta; Kazuo Numata, Yokohama; Isao Fukushima, Katsuta; Katsu Komuro, Katsuta; Takanobu Hatakeyama, Katsuta, all of Japan

[73] Assignee: Hitachi, Ltd., Tokyo, Japan

[22] Filed: Mar. 20, 1972

[21] Appl. No.: 235,922

[30] Foreign Application Priority Data
Mar. 19, 1971 Japan............................ 46/15155

[52] U.S. Cl.......... 318/203 R, 318/204, 318/207 R, 318/227, 318/229
[51] Int. Cl............................................... H02p 1/40
[58] Field of Search............... 318/202, 203 R, 204, 318/207 R, 227, 229

[56] References Cited
UNITED STATES PATENTS

| | | | |
|---|---|---|---|
| 2,384,864 | 9/1945 | Wickerham | 318/203 R |
| 2,970,251 | 1/1961 | Wickerham | 318/207 R |
| 3,430,122 | 2/1969 | Krabbe et al. | 318/207 R |
| 3,551,749 | 12/1970 | Hore | 318/207 X |
| 3,214,664 | 10/1965 | Ishikawa | 318/207 R |

*Primary Examiner*—Gene Z. Rubinson
*Attorney*—Paul M. Craig, Jr. et al.

[57] ABSTRACT

A control apparatus for an induction motor comprising a three phase induction motor, a three phase alternating current source for supplying a three phase alternating current voltage for the induction motor, parallel thyristors connected in the reverse direction to each other and inserted in an arbitrary phase of the three phase alternating current source for controlling the current flowing therethrough, contactors for changing the main circuit of the induction motor so as to reverse the direction of the phase rotation of the alternating current voltage when the induction motor is in a single phase operation by control of the thyristors, and a control device for operating the thyristors to substantially eliminate the current flowing therethrough in response to a reduction command and to increase the current again when the contactors complete changing the main circuit.

15 Claims, 5 Drawing Figures

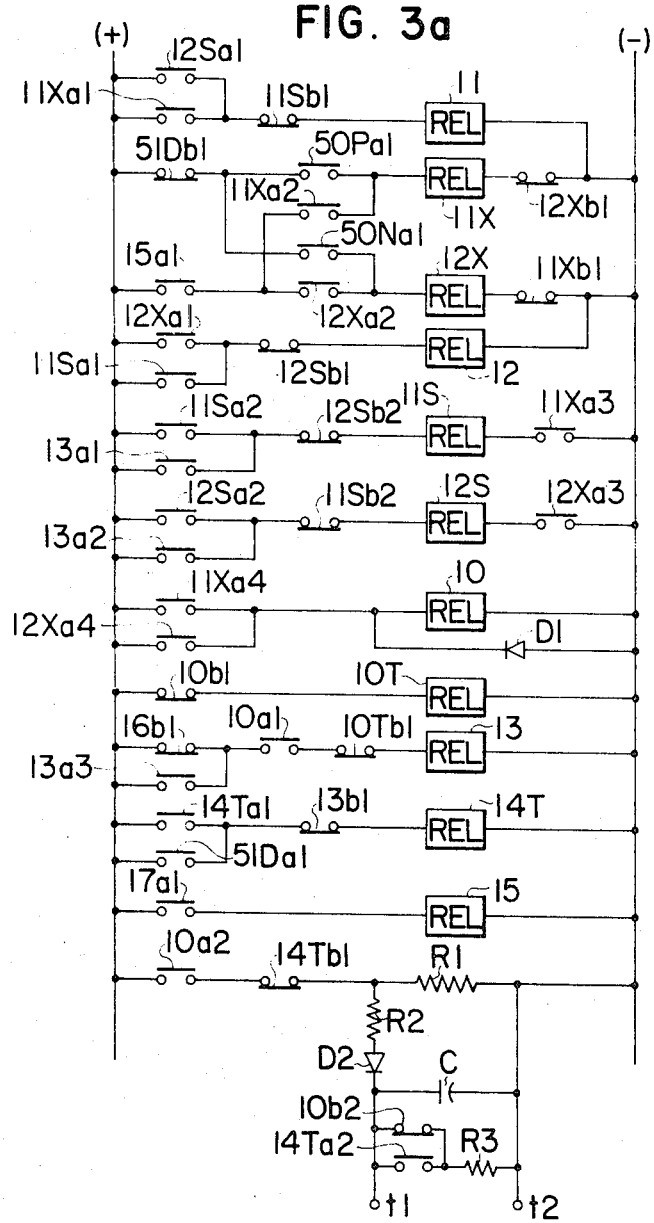

CONTROL APPARATUS FOR AN INDUCTION MOTOR

BACKGROUND OF THE INVENITON

The present invention relates to a control apparatus for an induction motor, and more particularly to a plugging control apparatus.

In conventional plugging of an induction motor, for instance for driving an elevator, when the speed reduction command comes in while the elevator is in operation, it is desired that the driving torque is smoothly shifted to the braking torque by controlling a bridge circuit inserted in two arbitrary phases of the source voltage of the main circuit of the induction motor. Because in practice an abrupt changeover from the driving torque to the braking torque causes the elevator to produce a shock in its movement, the riding quality of the elevator becomes extremely poor.

In addition, the bridge circuit in an alternating current circuit generally requires many saturable reactors or thyristors. In the case of the thyristor bridge circuit, for instance, at least eight thyristors are required since each of four arms of the bridge circuit has at least two thyristors connected in the reverse direction to each other in parallel. Further, a fairly large number of control elements must be used in order to control so many thyristors in the bridge circuit.

SUMMARY OF THE INVENTION

An object of the present invention is to provide a plugging control apparatus which does not cause an induction motor to produce any shock in its movement.

Another object is to achieve such a control by means of a simple main circuit arrangement.

According to a feature of one embodiment of the present invention, a control apparatus is provided which includes a variable impedance means in an arbitrary one phase line of a three phase alternating current source for an induction motor and means for changing the phase rotation of a three phase alternating current source. The impedance means serves to eliminate the current flowing through the phase line in which the impedance means is inserted in response to a speed reduction command for the induction motor. After the elimination of the current the changing means changes the main circuit so that the direction of the phase rotation will be opposite to the direction of the motor rotation, and after the changing of the main circuit the impedance means increases the current of the phase, once again.

Other object and features of the present invention will become apparent upon reading the following specification and inspection of the drawings and will be particularly pointed out in the claims.

BRIEF DESCRIPTION OF THE DRAWINGS

FIGS. 3a and 3b are a schematic diagram and a block diagram of a control circuit for controlling the main circuit shown in FIG. 1; and FIG. 4 is a waveform diagram showing the time sequence of relays used in the control circuit shown by FIG. 3a.

DESCRIPTION OF THE PREFERRED EMBODIMENT

Figure 1:
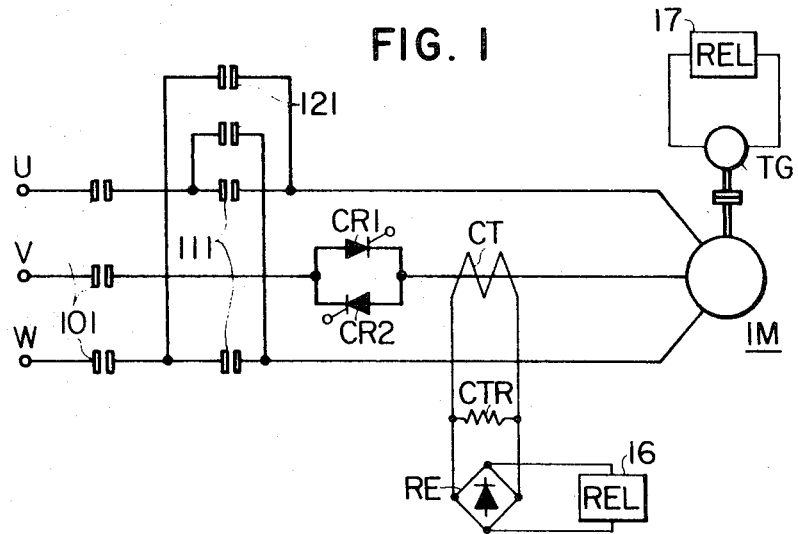
FIG. 1 is a schematic circuit diagram showing a main circuit according to an embodiment of this invention.

Referring to FIG. 1, an induction motor IM is supplied with a three phase alternating current voltage through terminals U, V, and W. The terminals U, V, and W correspond to the phases U, V, and W of the three phase alternating current voltage, respectively. Main contacts 101 of a relay 10 (FIG. 3a) open or close the main circuit. Contacts 111 and 121 are contacts of a relay 11 and a relay 12 (FIG. 3a), respectively. When the contacts 111 close and the contacts 121 open, a circuit is arranged so as to make the induction motor IM produce a positive phase sequence torque. On the other hand, when the contacts 111 open and the contacts 121 close, the induction motor IM produces a negative phase sequence torque owing to the reversal of the phase rotation of the three phase alternating current voltage.

A variable impedance element is inserted in an arbitrary phase in order to change the main circuit from three phases to a single phase or vice versa. The parallel thyristors CR1 and CR2 connected in the reverse direction to each other are inserted in the V phase circuit in this embodiment. A saturable reactor may also be used as the variable impedance element instead of the parallel thyristors. A current transformer CT detects the current through the phase having the parallel thyristors, and the output current of the current transformer CT is supplied to a resistor CTR. The voltage drop across the resistor CTR is rectified by a rectifier RE to operate a relay 16. The operation of the relay 16 indicates the condition of the main circuit, that is, it designates either the three phase circuit or the single phase one.

A tachogenerator TG is provided for measurement of the speed of the induction motor IM. The output voltage of the tachogenerator TG excites a relay 17 detecting the speed of the induction motor IM.

Figure 2:
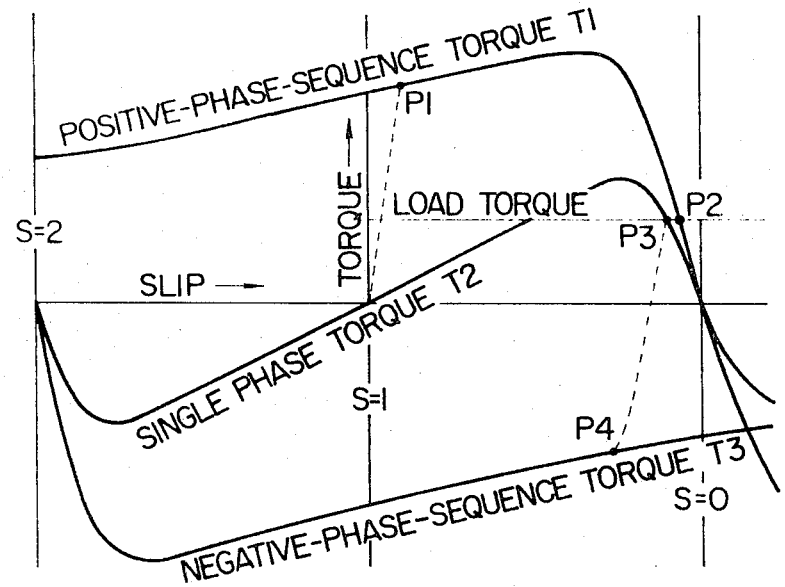
FIG. 2 is a characteristic diagram of the induction motor used for the purpose of this invention.

The principle of operation of the arrangement described above will be explained hereinafter by referring to FIG. 2. FIG. 2 shows three characteristics of the induction motor. The first one is a slip vs. torque curve T1 of the three phase induction motor operating in a positive phase sequence. The second one is a slip vs. torque curve T2 of the single phase induction motor. The last one is a slip vs. torque curve T3 of the three phase induction motor operating in a negative phase sequence. These characteristics are well known in this art.

If the thyristors CR1 and CR2 inserted in the V phase line are non-conductive, the motor IM is supplied with a single phase voltage. As is clear from the curve T2 in FIG. 2, the starting torque of the single phase induction motor is zero, so that the motor IM cannot start. Then, if the firing angle of the thyristors CR1 and CR2 increases, the voltage supplied for the motor IM gradually becomes a three phase alternating current voltage according to the increase in conduction of the thyristors. The motor IM thereby produces the torque needed to start. The torque produced by the motor IM increases along the dotted line in FIG. 2 with increase in conduction of the thyristors. When the thyristors are completely conductive, the motor IM is supplied the perfect three phase alternating current voltage to produce the torque corresponding to point P1 in FIG. 2.

Accordingly, the starting of the motor is smoothly carried out.

Subsequently, the speed of the motor IM increases according to the characteristic shown by the curve T1. Now, if the torque of a load is as shown by the dotted chain line in FIG. 2, the operation of motor IM balances at a point P2. When the stop or speed reduction command comes in while the motor IM is in operation under such a condition, the thyristors CR1 and CR2 are made non-conductive so that the main circuit now becomes a single phase one. The operation balancing point thus changes from the point P2 to the point P3. Although there is a difference in speed between the points P2 and P3, there is scarcely any shock to the elevator as the difference in speed is very small.

After changing from the three phase circuit to the single phase circuit, the phase rotation of the main circuit is reversed from the positive phase sequence to the negative phase sequence. There is no torque variation caused by changing the phase rotation in the single phase. After this, the thyristors CR1 and CR2 are made conductive again. The torque produced by the motor IM changes and increases gradually from the single phase torque to the negative phase sequence torque according to a characteristic shown by the dotted line between the points P3 and P4 in FIG. 2. When the thyristors CR1 and CR2 becomes fully conductive, the torque produced by the motor reaches a value corresponding to the point P4 on the torque curve T3.

The torque which is produced by the motor IM after the change of the phase rotation is a braking torque against the direction of the rotor rotation of the motor IM. The motor IM is reduced by this torque until it finally stops rotating.

Next, by referring to FIGS. 3a and 3b, the control operation of this invention will be explained in more detail. Before explanation of the control operation, the definition and explanation of the principal relays and contacts will be carried out as follows.

A positive rotation relay 11 and an auxiliary relay 11X are provided. When these relays are excited, the main circuit is arranged for positive rotation. A negative rotation relay 12 and an auxiliary relay 12X are provided. When these relays are excited, the main circuit is arranged for negative rotation. A relay 11S is provided for changing the main circuit from a positive rotation condition to a negative rotation condition. A relay 12S is provided for changing the main circuit from a negative rotation condition to a positive rotation condition. A main contact relay 10 serves to connect the main circuit of the motor to the alternating current source. Time relays 10T and 14T are provided having time delays of T1 and T2 (sec), respectively. One of the contacts 50Pa1 of a relay 50P (not shown) is operated when the relay is excited in order to make the motor operate in positive rotation. One of the contacts 50Na1 of a relay 50N (not shown) is operated when the relay is excited in order to make the motor operate in negative rotation. Contacts 51Da1 and 51Db1 of a relay 51D (not shown) are operated when the relay is excited by the reduction command.

The symbol for each contact has a special meaning which is identified as follows: the first two numerals plus the capital letter indicate the relay to which the contact belongs. The next small letter shows the type of the contact, that is, whether it is a normally open contact or a normally closed contact. In this case, the letter $a$ indicates the former and the letter $b$ indicates the latter. The last numeral is the number of the contact in the plural contacts belonging to the same relay. For example, a contact 12Sa1 is one of the normally open contacts of the relay 12S.

Besides the above explained symbols, D1 designates a diode which provides a time delay at the release of the relay 10. R1 to R3 designate resistors, C designates a condenser, and D2 designates a diode which prevents the current from flowing toward the resistor R2 during the discharge of the condensor C. The resistors R1 to R3, the condensor C and the diode D2 form a time lag circuit of the first order. The output of the circuit appears across terminals $t1$ and $t2$.

Figure 3B:
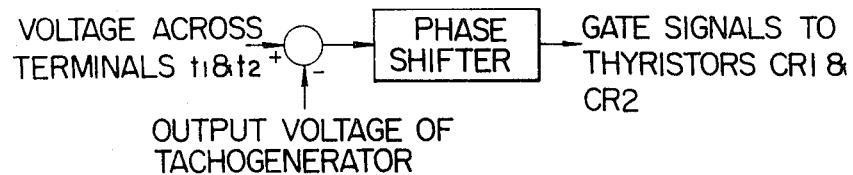

As is shown in FIG. 3b, the voltage across the terminals $t1$ and $t2$ becomes the reference compared with output voltage of the tachogenerator. A phase shifter controls the thyristors CR1 and CR2 in accordance with the difference between the reference and the output voltage of the tachogenerator.

The operation of the control circuit shown in FIGS. 3a and 3b is as follows.

If the command for positive rotation of the motor is produced, the relay 50P (not shown) is excited to close the contact 50Pa1. At this time, the relay 11X is excited by a circuit of $(+) - 51Db1 - 50Pa1 - 11X - 12Xb1 - (-)$. A contact 11Xa2 is closed to form a self-holding circuit of the relay 11X. As the contact 11Xa1 is closed, the relay 11 is excited by a circuit of $(+) - 11Xa1 - 11Sb1 - 11 - (-)$. The relay 10 is excited by closure of a contact 11Xa4. Accordingly, main contacts 101 and contacts 111 are closed, so that the main circuit is arranged to the positive-phase-sequence circuit. The motor IM is started thereby.

At this time, since a contact 10b1 is opened by the excitation of the relay 10, the relay 10T is released at the time delay T1 after opening of the contact 10b1. The contact 10Tb1, therefore, is opened, and the relay 13 is not excited, even if the contact 16b1 is closed, since the current through the V phase line is extremely small during starting of the motor IM.

Figure 4:
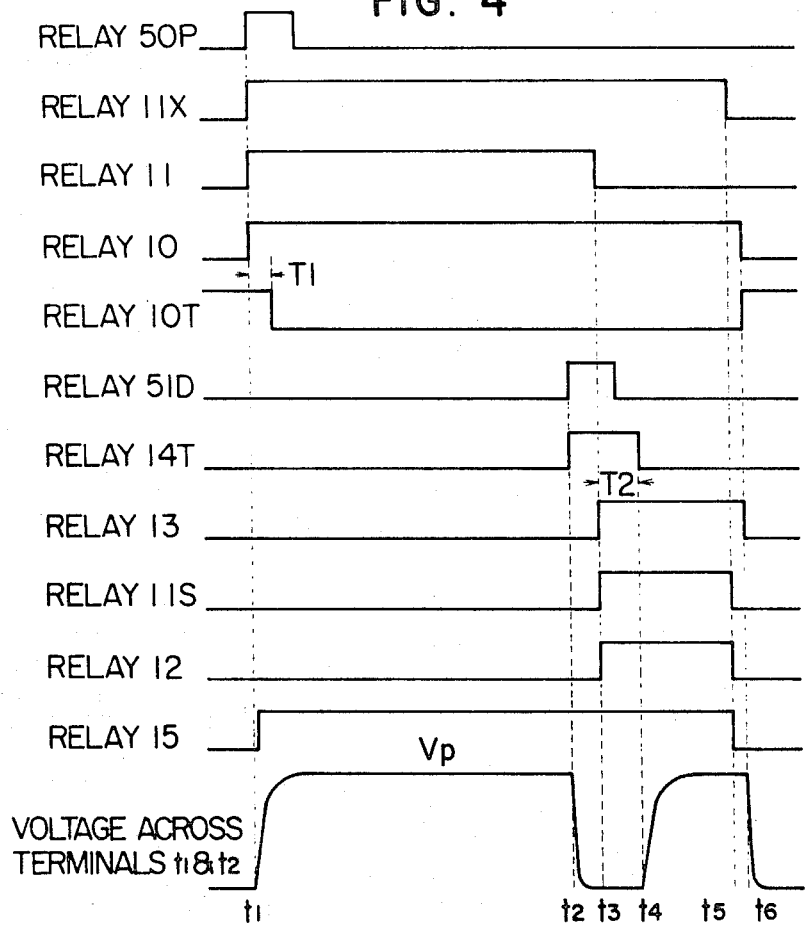

Further, the resistor R1 produces a voltage drop by closure of a contact 10a2. The condensor C is charged by the voltage drop through the resistor R2 and the diode D2. As the contact 10b2 is open, a voltage change between both terminals of the condensor C appears across the terminals $t1$ and $t2$. The voltage change has a time constant determined by the resistor R2 and the condensor C, as shown by the curve $Vp$ in FIG. 4. This voltage brings the thyristors CR1 and CR2 into a conductive condition by means of the apparatus comprising the phase shifter, as shown by FIG. 3b.

Before the thyristors CR1 and CR2 become conductive, a single phase alternating current voltage is supplied for the motor IM for lack of the V phase voltage. As well known, an induction motor does not produce a starting torque from a single phase voltage source. However, as the thyristors CR1 and CR2 increase the degree of their conductive condition, the three phase alternating current voltage is supplied for the motor IM though the three phase voltage is unbalanced. The motor IM therefore produces a torque according to the increase of the degree of the conductive condition of the thyristors CR1 and CR2. When the thyristors CR1 and CR2 become fully conductive, the motor IM produces a balanced three phase torque. After that, the motor IM is accelerated according to the characteristics of the slip vs. the positive phase sequence torque, as shown by the curve T1 in FIG. 2. The motor IM is operated at the speed corresponding to the point P2 where the torque produced by the motor IM balances with the load torque.

Then, when the reduction command comes in while the motor is in operation, the relay 51D (not shown) is excited. As the contact 51Da1 is closed thereby, the relay 14T is excited through the circuit of (+) − 51Da1 − 13b1 − 14T − (−). The relay 14T is self-held by closure of a contact 14Ta1. When the relay 14T is excited, a contact 14Tb1 is open and a contact 14Ta2 is closed. The voltage drop across the resistor R1 is extinguished by the opening of the contact 14Tb1, and therefore the voltage of the condensor C is discharged through the resistor R3 by the closure of the contact 14Ta2. The discharge of the condensor C is carried out according to a time constant determined by the condensor C and the resistor R3.

The discharge of the condensor C causes the thyristors CR1 and CR2 to decrease the degree of the conduction thereof, and finally makes the thyristors CR1 and CR2 non-conductive, the main circuit is transformed into a single phase circuit which lacks the V phase from the three phase source. The operating characteristic of the slip vs. the torque in the single phase is as shown by the curve T2 in FIG. 2. The operating point on the characteristic is shifted from the point P2 to the point P3. There is a speed difference between the two points, however, as the speed difference is very small and the shift from P2 to P3 is smoothly achieved nearly according to the time constant determined by the resistor R3 and the condensor C, the motor IM scarcely produces any shock.

When the thyristors CR1 and CR2 are made non-conductive, a relay 16 (FIG. 1) is released, since the output of the current transformer CT becomes zero. By the release of the relay 16, the contact 16b1 is closed, so that a relay 13 is excited through the circuit of (+) − 16b1 − 10a1 − 10Tb1 − 13 − (−). The relay 13 is self-held by the closure of a contact 13a1. As the relay 13 is excited, both contacts 13a1 and 13a2 are closed. However, a contact 11Xa3 is closed and a contact 12Xa3 is open, since the relay 11X is excited in response to the positive rotation command. Only the relay 11S, therefore, is excited by the circuit of (+) − 13a1 − 12Sb2 − 11S − 11Xa3 − (−). A contact 11Sa2 is closed to self-hold the relay 11S. The relay 12S is not excited. By the excitation of the relay 11S, a contact 11Sb1 is open and a contact 11Sa1 is closed, so that the relay 11 is released and the relay 12 is excited by the circuit of (+) − 11Sa1 − 12Sb1 − 12 − (−). The contacts 111 in FIG. 1 are open and contacts 121 are closed thereby, so that the main circuit is exchanged from the circuit for the positive phase sequence to the circuit for the negative phase sequence.

Further, since the relay 13 is excited, a contact 13b1 is open. At the time T2 after the opening of the contact 13b1, the relay 14T is released, so that the contact 14Tb1 is closed and the contact 14Ta2 is open, again. Therefore, the condensor C is recharged and the voltage $a$ across the terminals $t1$ and $t2$ increases according to the predetermined time constant to make the thyristors CR1 and CR2 conductive by means of the apparatus shown in FIG. 3b. At this time, since the main circuit is arranged for the negative phase sequence, the braking torque acts on the motor IM, that is, a plugging brake operation occurs. Accordingly, the time limit T2 of the relay 14T is desirably long enough to be able to change the main circuit from the positive phase sequence condition to the negative phase sequence condition or vice versa.

When the speed of the motor IM becomes extremely low, a relay 17 (FIG. 1) is released to open a contact 17a1. The relay 15 is released thereby to open a contact 15a1. The opening of the contact 15a1 opens the self-holding circuit (+) − 15a1 − 11Xa2 − 11X − 12Xb1 − (−) of the relay 11X. When the relay 11X is released to open the contact 11Xa3, the relay 11S is released. The circuit (+) − 11Sa1 − 12Sb1 − 12 − (−) is opened by the release of the relay 11S, so that the contacts 121 in the main circuit (FIG. 1) are opened to set the negative phase sequence circuit free. Further, after a little time delay from the release of the relay 11X, the relay 10 is released to cut off the motor IM from the alternating current source. By the release of the relay 10, the contacts 10a1 and 10a2 are open and the contacts 10b1 and 10b2 are closed. The closure of the contacts 10b1 causes the excitation of the relay 10T. The opening of the contact 10a1 releases the relay 13, and further the opening of the contact 10a2 and the closure of the contact 10b2 causes a reduction in the voltage across the terminals $t1$ and $t2$.

The control apparatus shown in FIGS. 3a and 3b controls the motor IM from start to stop in a manner as described above. The steps as described above are shown as a sequence of relay operations in FIG. 4. In this figure, the starting command for the positive rotation is produced by means of the excitation of the relay 50P at a time $t1$, and the reduction command is produced by the relay 51D at a time $t2$. The thyristors CR1 and CR2 are brought into non-conductive condition by decrease of the voltage Vp; therefore, the current of the V phase line becomes zero at a time $t3$. At a time $t4$ after the time delay T2 from the time $t3$, the voltage Vp starts to increase. It is necessary to change the main circuit to the negative phase sequence from the positive one between the times $t3$ and $t4$. At a time $t5$, the speed of the motor IM becomes nearly zero. The relay 11X is released thereby as described above. After that, at time $t6$, the relay 10 is released.

As explained above, according to the present invention, the plugging control of the induction motor is smoothly achieved by the simple main circuit. Having thus described the present invention, it is obvious that various modifications within the knowledge of workers in the art may be utilized without departing therefrom.

It is to be understood also that although the invention has been described with specific reference to a particular embodiment thereof, it is not to be so limited, since changes and alterations therein may be made which are within the full intended scope of this invention, as defined by the appended claims.

What is claimed is:

1. A control apparatus for controlling the operation of a three phase induction motor from a three phase alternating current source connected to said motor, comprising variable impedance means inserted in the line carrying one selected phase of said three phase alternating current source to said motor for controlling the current flowing therethrough, control means for operating said impedance means to substantially eliminate the current flowing therethrough in response to a speed reduction command, means for producing an output signal when said motor is in single phase operation due to control by said impedance means, switching means for switching the lines of said source connected to said motor so as to reverse the direction of the three phase rotation of said alternating current voltage in response to said output signal, and further means for controlling said impedance means to increase said current therethrough in response to said switching means completing the reversing of said three phase rotation.

2. A control apparatus for an induction motor according to claim 1 wherein said control means comprising reference means for producing a reference voltage which starts to increase simultaneously with the start of said motor, decreases in response to a reduction command for said motor and recovers to a selected value after a predetermined time after the current of said selected one phase becomes substantially zero while said motor is in operation, and means for controlling said variable impedance means in accordance with the difference between said reference voltage and the speed of said motor.

3. A control apparatus for an induction motor according to claim 1 wherein said producing means comprises a first relay excited when the current of said selected one phase becomes substantially zero while said motor is in operation.

4. A control apparatus for an induction motor according to claim 2 wherein siad reference means comprises a second relay excited in response to said reduction command and released after said predetermined time after the current of said selected one phase becomes substantially zero while said motor is in operation, and a condensor circuit repeating a charge and a discharge thereof according to the operation of said second relay.

5. A control apparatus for an induction motor according to claim 2 wherein said predetermined time is a period long enough to reverse said phase of rotation by means of said switching means.

6. A control apparatus for controlling the operation of a three phase induction motor selectively connected to a three phase alternating current source by way of three individual phase lines, comprising
first relay means having contacts in each of said three phase lines for selectively connecting said alternating current source to said induction motor,
second relay means having contacts in only a first and a second line of said three phase lines for selectively disconnecting said lines from said induction motor,
third relay means having a contact connecting said first phase line to said second phase line and another contact connecting said second phase line to said first phase line for reversing the connections of said first and second phase lines to said induction motor, and
variable impedance means connected in a third line of said three phase lines to control the current flowing therein, said second and third relay means being responsive to a predetermined condition of the current in said third line controlled by said variable impedance means for respectively opening and closing the contacts thereof.

7. A control apparatus according to claim 6, further including control means responsive to a speed reduction command for operating said variable impedance means to gradually eliminate the current flowing in the third line of said three phase lines.

8. A control apparatus according to claim 7, further including current sensing means for detecting a zero current condition in said third line of said three phase lines, said second relay means being responsive to said current sensing means to open its contacts and said third relay means being responsive to said current sensing means to close its contacts when said zero current condition is detected.

9. A control apparatus according to claim 8, further including timing means for releasing said control means to control said variable impedance means to gradually increase the current in said third line of said three phase lines to rated value.

10. A control apparatus according to claim 9 wherein said impedance means includes a pair of reversely connected thyristors and said control means includes a capacitor charging circuit connected to said thyristors for controlling the conduction thereof.

11. A method for stopping a three phase induction motor operating from a three phase alternating current source comprising the steps of
switching said three phase current to a single phase current to initiate stopping said motor while providing essentially the same motor torque as in the three phase alternating current operation of the motor,
reversing two of said phases of alternating current from said source, and
gradually converting said single phase alternating current to said reversed three phase alternating current to produce a stopping of said motor.

12. A method as defined in claim 11 wherein said switching step is performed by opening one of the three phase lines from said alternating current source.

13. A method as defined in claim 12 wherein said one of the three phase lines is opened by operating a switching device connected in the line.

14. A method for controlling the operation of a three phase induction motor from a three phase alternating current source comprising the steps of
applying to said induction motor initially a single phase alternating current from said alternating current source,
gradually converting said single phase alternating current to a three phase alternating current to produce progressive starting of said induction motor until full rated current is applied thereto,
operating said motor at full rated three phase current from said alternating current source,
switching said three phase current to a single phase current to initiate stopping said motor,
reversing two of said phases of alternating current from said source, and
gradually converting said single phase alternating current to said reversed three phase alternating current to produce a stopping of said motor.

15. A method as defined in claim 14 wherein said switching step is performed by opening one of the three phase lines from said alternating current source.

* * * * *